United States Patent
Kotzur et al.

(10) Patent No.: US 11,181,370 B2
(45) Date of Patent: Nov. 23, 2021

(54) TOTAL STATION WITH A CALIBRATION FUNCTIONALITY FOR INSTRUMENT ERRORS

(71) Applicant: LEICA GEOSYSTEMS AG, Heerbrugg (CH)

(72) Inventors: Norbert Kotzur, Altstätten (CH); Hannes Maar, Dornbirn (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 258 days.

(21) Appl. No.: 16/355,558

(22) Filed: Mar. 15, 2019

(65) Prior Publication Data
US 2019/0285434 A1    Sep. 19, 2019

(30) Foreign Application Priority Data
Mar. 15, 2018 (EP) .................... 18162135

(51) Int. Cl.
*G01C 15/00* (2006.01)
*G06T 7/33* (2017.01)
(Continued)

(52) U.S. Cl.
CPC ............ *G01C 15/008* (2013.01); *G01C 1/04* (2013.01); *G01C 15/002* (2013.01); *G01C 25/00* (2013.01);
(Continued)

(58) Field of Classification Search
CPC .... G01C 15/002; G01C 15/008; G01C 15/00; G01C 1/04; G01S 17/86; G01S 17/42;
(Continued)

(56) References Cited

U.S. PATENT DOCUMENTS

| 7,623,224 B2 | 11/2009 | Vogel |
| 7,982,866 B2 | 7/2011 | Vogel |

(Continued)

FOREIGN PATENT DOCUMENTS

| CN | 102947672 A | 2/2013 |
| CN | 103547939 A | 1/2014 |
| CN | 105474037 A | 4/2016 |

OTHER PUBLICATIONS

European Search Report dated Sep. 27, 2018 as received in Application No. 18162135.

*Primary Examiner* — Luke D Ratcliffe
(74) *Attorney, Agent, or Firm* — Maschoff Brennan

(57) ABSTRACT

A total station configured for receiving from a camera a first image captured in a first face and a second image captured in a second face, wherein in the second face the camera is rotated around the optical axis by between 170° and 190° compared to the first face, receiving at least one of an azimuthal angle pair and an elevative angle pair, said azimuthal angle pair comprising a first azimuthal angle and a second azimuthal angle, and said elevative angle pair comprising a first elevative angle a second elevative angle, matching the first image and the second image with a relative rotation and a relative translation, determining the relative rotation of the matched first image and second image, determining the relative translation of the matched first image and second image, based on the respective angle pair, the relative rotation, the relative translation, and determining an instrument error.

15 Claims, 4 Drawing Sheets

(51) Int. Cl.
*G01C 1/04* (2006.01)
*G01C 25/00* (2006.01)
*G01S 7/497* (2006.01)

(52) U.S. Cl.
CPC ............... *G01S 7/497* (2013.01); *G06T 7/33* (2017.01); *G06T 2207/30181* (2013.01)

(58) Field of Classification Search
CPC ..... G01S 7/4972; G01S 7/497; G01B 11/002; G02C 25/00; G06T 7/33; G06T 2207/30181
See application file for complete search history.

(56) References Cited

U.S. PATENT DOCUMENTS

| | | |
|---|---|---|
| 9,563,952 B2 | 2/2017 | Glimm et al. |
| 2013/0094707 A1 | 4/2013 | Metzler |
| 2014/0009604 A1* | 1/2014 | Hinderling ........... G01C 15/002 348/142 |
| 2014/0348388 A1 | 11/2014 | Metzler |
| 2014/0375795 A1 | 12/2014 | Glimm et al. |
| 2016/0025491 A1* | 1/2016 | Kotzur ................. G01C 15/002 348/135 |
| 2016/0169671 A1 | 6/2016 | Winter |

* cited by examiner

Horizontal collimation error face 2

Vertical index error face 1

Vertical index error face 2

Field of view face 1

Field of view face 2

TOTAL STATION WITH A CALIBRATION FUNCTIONALITY FOR INSTRUMENT ERRORS

CROSS-REFERENCE TO RELATED APPLICATIONS

This application claims priority to European Patent Application No. 18162135.0, filed on Mar. 15, 2018. The foregoing patent application are incorporated herein by reference.

FIELD OF INVENTION

The present invention relates to a total station, which is a coordinate measuring surveying instrument used for surveying e.g. land, buildings, and constructions sites. Total stations are also referred to as theodolites or tachymeters.

BACKGROUND

Almost all total stations on the market have a field calibration function to derive instrument errors. Mostly, this is done manually just by looking through the telescope and manually positioning the crosshair exactly onto a target. This is a tedious and error prone procedure and requires experience and time to achieve high accuracy.

Document U.S. Pat. No. 7,982,866 B2 discloses a total station by which axis errors can be determined with help of manual photogrammetric aiming onto coordinated targets in a first face and in a second face.

Document US 2016/0025491 A1 discloses a total station configured for calibrating the digital crosshair (aligning with optical crosshair in Telescope) with manual or automatic aiming onto targets with the optical and the digital crosshair.

Common problems accordingly existing in prior art are:
  An operator needs to manually aim through the telescope and precisely adjust the optical crosshair onto a target.
  Because of the manual calibration process the achieved accuracy of the instrument errors is not constant.
  Especially total stations not having an ocular (aiming only with help of displayed camera image onboard the total station or on a connected controller) cannot be calibrated with the existing approaches.
  Monitoring stations cannot be calibrated by remote access, i.e. an operator always needs to be on site.

Document U.S. Pat. No. 7,623,224 B2 discloses a total station by which axis errors can be determined by automatically aiming onto coordinated targets and processing of captured images in a first face and in a second face.

Document U.S. Pat. No. 9,563,952 B2 discloses a total station by which axis errors can be determined with help of detection of pixel offsets of certain patterns in images captured in a first face and in a second face. Here, the total station exactly turns by Hz=200 gon and V=400-V(first face) after a first image capture, and then takes a second image. The image difference is computed, wherein for processing, the images captured in the first face or in the second face are rotated by 200 gon in the image plane in advance.

Document US 2014/0375795 A1 discloses a total station by which axis errors can be determined by detecting pixel offsets of certain patterns in images captured in a first face and in a second face. Here, the total station extracts the target in the first face and turns to this pattern in the second face. Then, the image difference is computed, wherein for processing, the images captured in the first face or in the second face are rotated by 200 gon in the image plane in advance.

Hence, there are total stations overcoming the above mentioned problems. The present invention provides a total station with an alternative calibration functionality for instrument errors.

BRIEF DESCRIPTION

Some aspects of the invention relate to a total station comprising a base, a support rotatably arranged on the base around a vertical axis, an azimuthal angle encoder configured for measuring an azimuthal angle of the support, a telescope rotatably arranged on the support around a horizontal axis, said telescope comprising a laser unit configured for emitting a measuring beam along a beam axis, a camera configured for capturing images with a field of view comprising the beam axis at least in part, an elevative angle encoder configured for measuring an elevative angle of the telescope, a computer unit configured for receiving from the camera a first image captured in a first face and a second image captured in a second face, wherein in the second face the camera is rotated around the optical axis by between 170° and 190° compared to the first face, and wherein the fields of view of the camera in the first face and in the second face overlap at least in part, receiving from the respective angle encoder(s) at least one of an azimuthal angle pair and an elevative angle pair, said azimuthal angle pair comprising a first azimuthal angle in a first face and a second azimuthal angle in a second face, and said elevative angle pair comprising a first elevative angle in the first face and a second elevative angle in the second face, matching the first image and the second image with a relative rotation and a relative translation, determining the relative rotation of the matched first image and second image, determining the relative translation of the matched first image and second image, based on the respective angle pair(s), the relative rotation, the relative translation, determining an instrument error comprising at least one of a horizontal collimation error, a vertical index error, based on the instrument error, applying an angle offset to each reading of the respective angle encoder(s).

The camera may be an on-axis-camera with an optical axis aligned with the beam axis, or an off-axis-camera with a known relative pose with regard to the laser unit.

Matching may be based on at least one of a pattern matching algorithm and a classification algorithm.

The respective algorithm may be designed for analysing image features captured within the overlap of the fields of view of the camera in the first face and in the second face.

The image features may comprise the imaging of at least one specifically designed target, in particular at least one prism.

In one embodiment, the total station may comprise an Automatic Target Recognition (ATR)-system having an ATR-camera and a flash unit, said ATR-camera configured for capturing ATR-images of reflections of a flash emitted by the flash unit, wherein the camera (as described above) is the ATR-camera. Consequently, the ATR-camera may be an on-axis-camera with an optical axis aligned with the beam axis, or an off-axis-camera with a known relative pose with regard to the laser unit. As such, the ATR-camera would have the functionality of a regular ATR-camera known from prior art (sensitive to the wavelength of the ATR-flash light), and as well the functionality of a regular camera (having a b/w or colour sensor, such as CCD or CMOS).

In another embodiment, the total station may comprise an Automatic Target Recognition (ATR)-system having an ATR-camera (other than the existing camera) and a flash unit, said ATR-camera configured for capturing ATR-images of reflections of a flash emitted by the flash unit, wherein the pose of the ATR-camera relative to the camera is represented by a calibrateable pose-value, wherein the computer may be further configured for receiving ATR-images from the ATR-camera, and for calibrating the pose-value based on at least one of a first image pair and a second image pair, said first image pair comprising the first image and a first ATR-image captured in the first face, and said second image pair comprising the second image and a second ATR-image captured in the second face.

The instrument error may further comprise a tilting axis error, which is an angular deviation of the horizontal axis from a perfect horizontal plane.

In the first face and in the second face, the telescope may be pointing in a direction close to the vertical axis. The term "close" in this context may be understood as said direction of the telescope forming an angle of less than 45° with the vertical axis. In particular, said angle is less than 20°, in particular less than 10°, in particular less than 5°. The smaller said angle is, the better may a tilting axis error be determined because a smaller angle increases the relative rotation and/or the relative translation in the images.

Some aspects of the invention further relate to a method of determining and factoring instrument errors of a total station in when performing a subsequent measurement, said total station having a base, a support rotatably arranged on the base around a vertical axis, an azimuthal angle encoder configured for measuring an azimuthal angle of the support, a telescope rotatably arranged on the support around a horizontal axis, said telescope comprising a laser unit configured for emitting a measuring beam along a beam axis, a camera configured for capturing images with a field of view comprising the beam axis at least in part, an elevative angle encoder configured for measuring an elevative angle of the telescope, and a computer unit, said method comprising, with the computer unit, receiving from the camera a first image captured in a first face and a second image captured in a second face, wherein in the second face the camera is rotated around the optical axis by between 170° and 190° compared to the first face, and wherein the fields of view of the camera in the first face and in the second face overlap at least in part, receiving from the respective angle encoder(s) at least one of an azimuthal angle pair and an elevative angle pair, said azimuthal angle pair comprising a first azimuthal angle in a first face and a second azimuthal angle in a second face, and said elevative angle pair comprising a first elevative angle in the first face and a second elevative angle in the second face, matching the first image and the second image with a relative rotation and a relative translation, determining the relative rotation of the matched first image and second image, determining the relative translation of the matched first image and second image, based on the respective angle pair(s), the relative rotation, the relative translation, determining an instrument error comprising at least one of a horizontal collimation error, a vertical index error, based on the instrument error, applying an angle offset to each reading of the respective angle encoder(s).

The step of matching may be based on at least one of a pattern matching algorithm and a classification algorithm.

The method may further comprise, with the respective algorithm, analysing image features captured within the overlap of the fields of view of the camera in the first face and in the second face.

In case the total station further has an Automatic Target Recognition (ATR)-system having an ATR-camera and a flash unit, the method may further comprise, with the ATR-camera, capturing at least one of a first image pair and a second image pair, said first image pair comprising the first image and a first ATR-image captured in the first face, and said second image pair comprising the second image and a second ATR-image captured in the second face, said ATR-images capturing reflections of a flash emitted by the flash unit, wherein the pose of the ATR-camera relative to the camera is represented by a calibrateable pose-value, with the computer unit, receiving from the ATR-camera the first image pair or the second image pair, respectively, and with the computer unit, calibrating the pose-value based on the first image pair or the second image pair, respectively.

In the telescope is brought in the first face and in the second face, the telescope may particularly point in a direction close to the vertical axis. The term "close" in this context may be understood as said direction of the telescope forming an angle of less than 45° with the vertical axis. In particular, said angle is less than 20°, in particular less than 10°, in particular less than 5°. The smaller said angle is, the better may a tilting axis error be determined because a smaller angle increases the relative rotation and/or the relative translation in the images.

Some aspects of the invention also relate to a computer programme product comprising program code stored on a machine-readable medium, or computer-data-signal embodied as an electromagnetic wave, for executing a method as described herein, in particular executed in a computer unit of a total station as described herein.

BRIEF DESCRIPTION OF THE DRAWINGS

In the following, the invention will be described in detail by referring to exemplary embodiments that are accompanied by figures, in which.

DETAILED DESCRIPTION

This invention relates to total stations which are equipped with a camera, be it on-axis or off-axis or both. On-axis means, the camera is using the optical path of the telescope (beam axis of the laser unit). Off-axis means, the camera is built in the telescope housing and its optical axis is quasi parallel to the axis of the telescope. From an off-axis camera the relative pose to the laser unit and/or the on-axis camera is known, but this known pose-value can change over time and hence can be calibrated.

Figure 1:
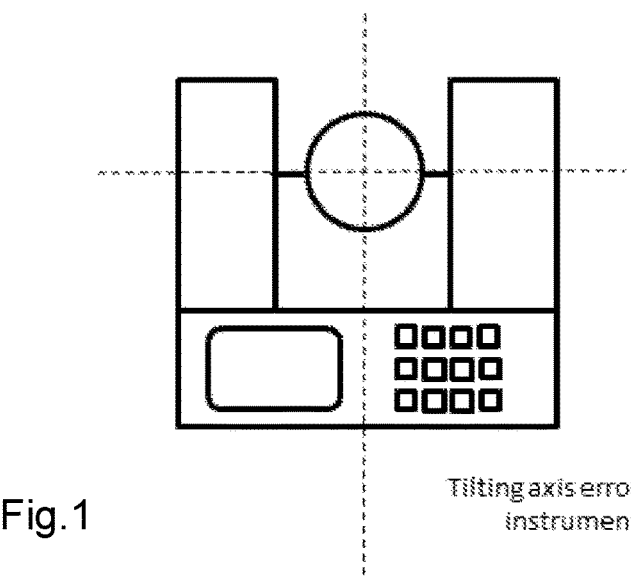
FIGS. 1,2: show the ideal (error free) axes of a total station.
Figure 2:
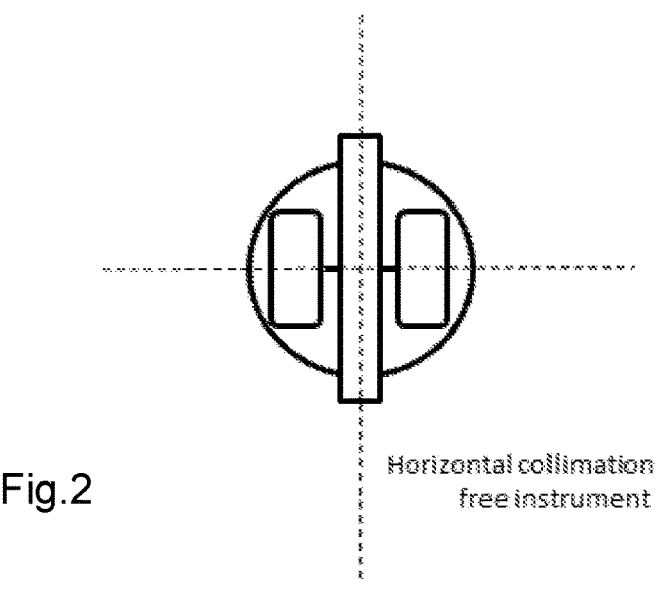
Figure 3:
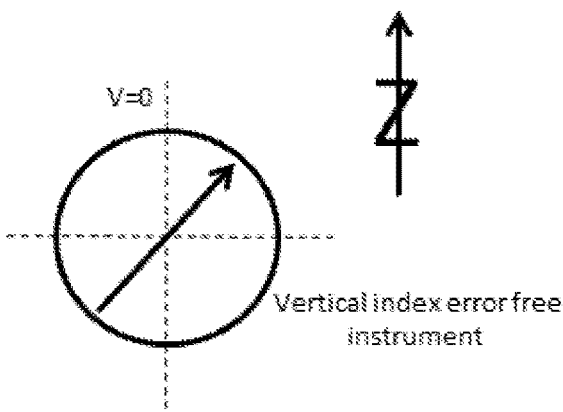
FIG. 3: shows an error free vertical index of a total station.
Figure 4:
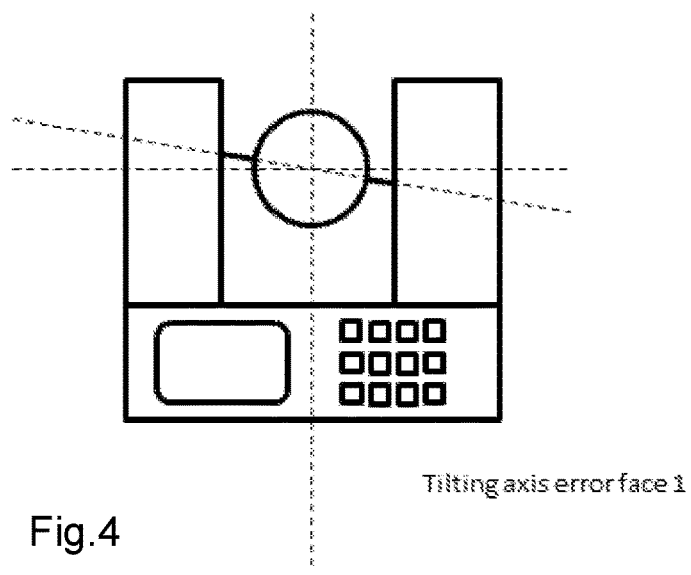
FIGS. 4,5: show the tilting axis of a total station with an error in a first and in a second face.
Figure 5:
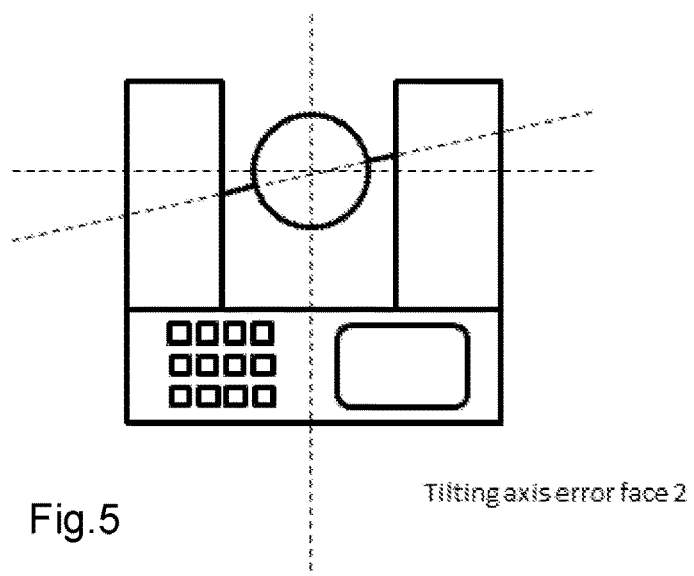
Figure 6:
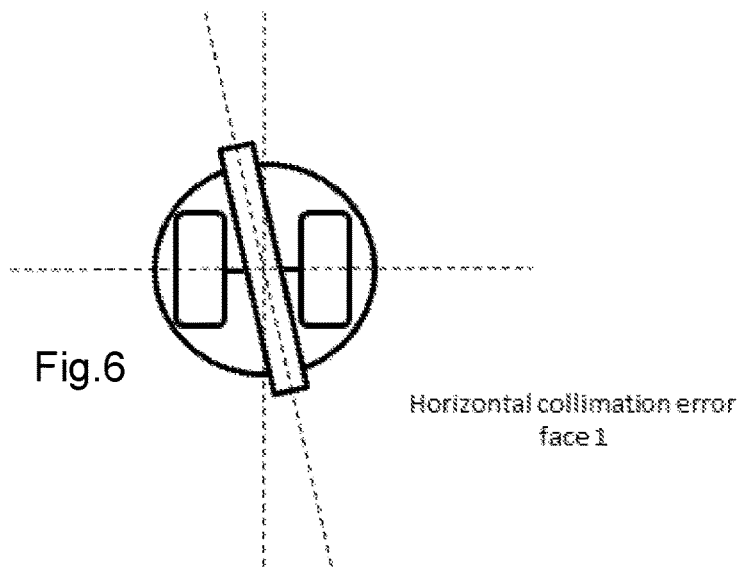
FIGS. 6,7: show the horizontal axis of a total station with an collimation error in a first and in a second face.
Figure 7:
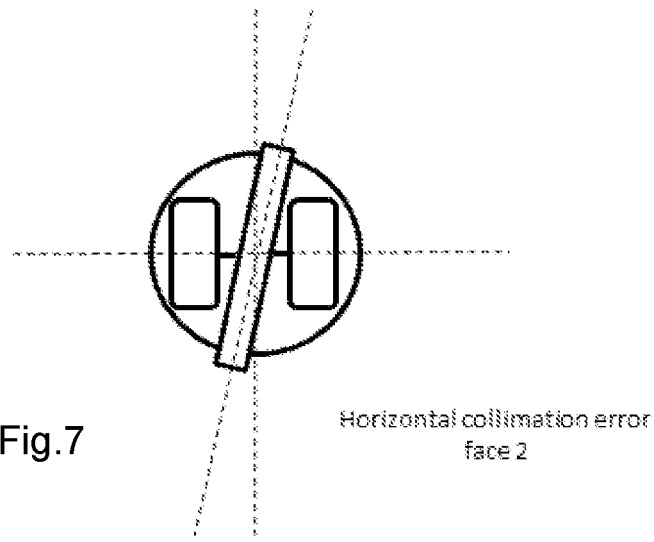

The total station geometry is mainly characterised by a vertical (standing) axis, a horizontal (tilting) axis, and the aiming axis (beam axis) which all three axes are ideally perpendicular to each other, such as shown in FIGS. 1, 2, and 3. However, due to assembly tolerances, there are always some deviations in the tilting axis and aiming axis from said ideal geometry. FIGS. 4 and 5 show a tilting axis error, and FIGS. 6 and 7 show a horizontal collimation error.

Figure 8:
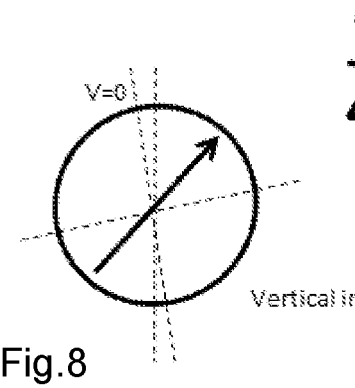
FIGS. 8,9: show a vertical index of a total station with a error.
Figure 9:
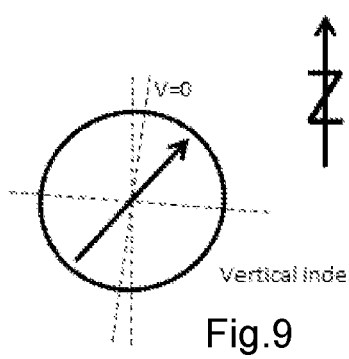

Furthermore, the zero point of the circle of the vertical angle measure does usually not point exactly in the same direction as the vertical axis, i.e. towards the zenith, when the total station is set up exactly upright. This is called index error and is shown in FIGS. 8 and 9.

Figure 10:
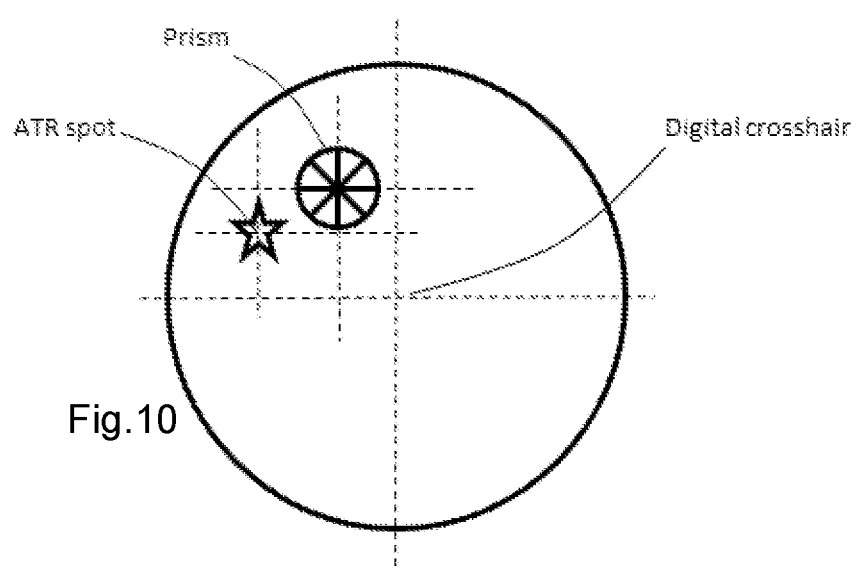
FIGS. 10,11: show the fields of view of the ATR-camera overlaid onto the fields of view of the on-axis camera in a first and in a second face.
Figure 11:
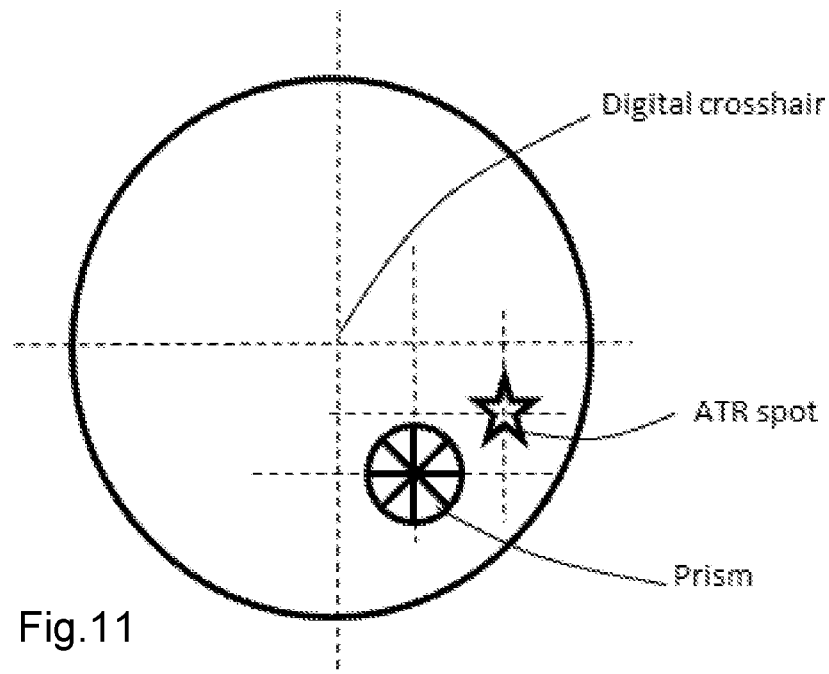

Modern total stations can further be equipped with an Automatic Target Recognition (ATR)-system. Also this ATR mostly has an offset to the target line (beam axis) of the telescope, which is shown in FIGS. 10 and 11.

All above mentioned instrument errors are calibrated during the production process. A table in the theodolite software contains these calibration data and—derived therefrom—corrections are applied when measuring horizontal and vertical angle. When speaking herein of "factoring in" or "applying an angle offset to a reading of the respecting angle encoder", it means the above mentioned table and the content of the table can be updated (calibrated).

Tilting axis error and aiming axis error, the zero point of the vertical circle, as well as the ATR-Offset are not stable over time. They are influenced for example by physical shocks during transportation, aging, temperature or other material properties resulting in measurement errors when only measuring in a first face and not averaging the angular reading of the first and a second face.

First and second faces commonly describe two alternative settings of the telescope of the total station for directing towards the same target. The classic way of doing this is to target a specific point by using a crosshair, and then to measure the azimuthal and elevative angle in this setting. Then the support (which is holding the telescope) is turned roughly 180° and the telescope is flipped over to roughly point at the target point again, but this time "upside down". Then another precise targeting of the point takes place and the azimuthal and elevative angles are measured again. Based on the measured angles in the first and second faces, an error is determined.

In context of the present invention and the description herein, however, the two faces are defined as only roughly directing towards same target, i.e. at least some features must be in the field of view of the camera in the first face and in the second face. It is not necessary that the telescope points at a specific same target (e.g. by a cross hair or the camera sensor's centre) after doing a flip over (moving from first face to second face).

The purpose of this invention is accordingly to provide a user field calibration which enables the operator to derive updated correction values for tilting axis error, aiming axis error, vertical index error, and/or ATR offset based on captured images.

The advantage of this image-based approach is that in order to get a constantly high accuracy of the measurements, a user of the total station can individually calibrate the total station in maximum two steps with or without special targets, and in particular without the need to exactly orientate the telescope such that it points to one and the same target point or field of view (which would require a physical or digital crosshair).

Horizontal Collimation Error, Vertical Index Error, ATR Offset:

In an exemplary work flow (embodiment of a method according to the invention), an embodiment of the total station according to the invention is set up such that the telescope aims towards a prism in a first face and then records the horizontal and vertical angles. The target (prism) only needs to be in the field of view of the telescope (see FIG. 10), without the need of a precisely centred aiming. The total station then captures an image with the on-axis-camera (can also be an off-axis-camera). Optionally, a distance is measured with the EDM through the telescope. In particular, the measured distance can also be used to further improve the determination of the instrument errors. Further optionally, an Automatic Target Recognition (ATR)-system sends out a laser pulse which is reflected by the prism and is received by the ATR-camera.

Then the instrument turns to a second face and again records the horizontal and vertical angles, an image is captured with the on-axis camera. Optionally, a distance measurement is triggered and/or the ATR-system again sends out a laser pulse which is reflected by the prism and is received by the ATR-camera.

Again, the target only needs to be anywhere in the field of view of the telescope (see FIG. 11) and it is not required the target to be in the same area of the image as in the first face.

Based on a pattern matching and/or classification algorithm, rotations in the image plane of both images (from the first and second face) and pixel offset in x- and y-direction in the image plane between the target centres of the first and the second face image is determined. One of the two images is roughly "upside down" relative to the other image in respect of an axis of rotation which is perpendicular to the image plane.

Based on a deviation of the first rotation from a perfect 180° angle, on the determined x-/y-pixel offsets, and on the angle readings in the first and second face, an instrument error is determined, and an angular offset is generated and can henceforward be added to angular readings.

Figure 12:
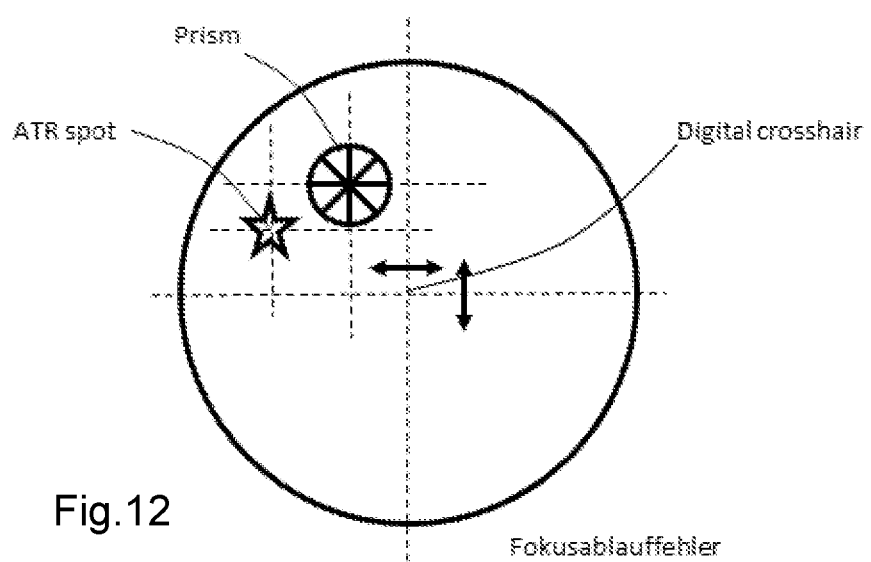
FIG. 12: shows errors resulting from a focus shift error.

To optionally improve the accuracy, based on the measured distance, a correction value can additionally be considered for the focus shift error (error based on an unstable target line when moving the focus lens) when determining the horizontal and vertical angles (see FIG. 12). The pixel offset of both faces is a representation of the instrument error. When the pixel offset is determined it can be applied to each regular survey observation.

To optionally improve the accuracy, also relative rotations of the image in the first face and the image in the second face in respect of other axes of rotations can be considered. Such other axes are perpendicular to each other and both located within the image plane of the matched images.

In addition, the ATR-spot on the ATR-camera may also be processed at the same time with the other instrument errors. The ATR-camera is usually a different camera than the on-axis camera. With each image captured in the first face and the second face, also an ATR-measurement may be performed.

The laser pulse returning from the prism to the ATR-system leaves a spot on the ATR-camera sensor. The pixel offset of the ATR-spot centre is transformed to be in the same system as the on-axis camera. This may be realised with a scale factor to cover pixel size and different resolution, a shift in x- and y-direction and a rotation in the image plane.

Once the on-axis camera and the ATR-camera are referenced relative to each other, the deviation of the ATR-spot centre to the prism centre can be derived. This process may again be based on matching algorithms or classification algorithms. The derived pixel offset is now converted in an angular value and can be factored in to subsequent detail point measurements.

Tilting Axis Error

To derive the tilting axis error with high accuracy, measurements may preferably be performed at "steeper" sighting, either up or down e.g. at ~70 gon or ~130 gon vertical angle. In other words, the telescope is pointing in a direction that comes close to the vertical axis. The process is the same as described above, or may be described as follows:

For example, the instrument is set to target a prism in a first face, wherein the prism is within the field of view of the telescope (see FIG. 10). Then the horizontal and vertical angles are recorded, and an image is captured with the camera. Optionally, a distance measurement can be performed.

The instrument is then turned to a second face, wherein again the prism just needs to be anywhere in the field of view of the telescope (see FIG. 11). The horizontal and vertical angles are recorded, an image is captured with the camera, and again optionally, a distance measurement may be triggered.

Again, based on the pattern matching algorithm and/or classification algorithm, the rotation in the image plane of both images (in the first and second faces) and the pixel offset in the image plane in x- and y-direction between the target centres of the first face and the second face images is derived. The pixel offsets are converted into an angular representation and added to the angular reading. To improve the accuracy, a correction value for the focus shift error can additionally be applied to the horizontal and vertical angles based on the distance measurement (see FIG. 12). The horizontal and vertical angles resulting from this can be used by the regular algorithm to derive horizontal collimation error and vertical index error.

A particular advantage of the calibration functionality according to the invention is that it could provide automatic determination of (a) horizontal collimation error, (b) vertical index error, (c) ATR Offset, and (d) tilting axis error at one go.

For improving the correction of tilting axis errors, steep targets (up or down) are used within the functionality. The focus shift error, which causes a jittering target line, may be used to correct the horizontal and vertical angles before the determination of the instrument errors.

In a particular embodiment, the on-axis camera is also used as the ATR-camera. In this case, the transformation of the ATR spot to on-axis camera image coordinate system is obsolete.

In another embodiment, a calibrated overview camera in the telescope housing may be used with fix-focus or auto-focus for capturing the calibration images.

Optionally, the calibration routines may be repeated in loops to increase the accuracy.

In particular, the tilting axis error calibration can preferably be done after the horizontal collimation error calibration to distinguish error influences. It is also possible to perform a least squares adjustment with the complete data set to derive horizontal collimation error, vertical index error, ATR-offset and tilting axis error in one computation step.

Once a survey point was measured in two faces, it may be checked automatically by means of the inventive functionality whether the previously determined instrumental errors are still valid or have changed.

Although the invention is illustrated above, partly with reference to some preferred embodiments, it must be understood that numerous modifications and combinations of different features of the embodiments can be made. All of these modifications lie within the scope of the appended claims.

The invention claimed is:

1. A total station comprising:
    a base;
    a support rotatably arranged on the base around a vertical axis;
    an azimuthal angle encoder configured for measuring an azimuthal angle of the support;
    a telescope rotatably arranged on the support around a horizontal axis, said telescope comprising:
        a laser unit configured for emitting a measuring beam along a beam axis,
        a camera configured for capturing images with a field of view comprising the beam axis at least in part,
    an elevative angle encoder configured for measuring an elevative angle of the telescope, and
    a computer unit configured to:
        receive from the camera a first image captured in a first face and a second image captured in a second face, wherein in the second face the camera is rotated around the optical axis by between 170° and 190° relative to the first face, and wherein the fields of view of the camera in the first face and in the second face overlap at least in part,
        receive at least one of an azimuthal angle pair from the azimuthal angle encoder or an elevative angle pair from the elevative angle encoder, said azimuthal angle pair comprising a first azimuthal angle in a first face and a second azimuthal angle in a second face, and said elevative angle pair comprising a first elevative angle in the first face and a second elevative angle in the second face,
        match the first image and the second image with a relative rotation and a relative translation,
        determine the relative rotation of the matched first image and second image,
        determine the relative translation of the matched first image and second image,
        based on the elevative angle pair or the azimuthal angle pair, the relative rotation, the relative translation, determining an instrument error comprising at least one of
            a horizontal collimation error,
            a vertical index error,
        based on the instrument error, applying an angle offset to each reading of the elevative angle encoder or the azimuthal angle encoder.

2. The total station according to claim 1,
    wherein the camera is an on-axis-camera with an optical axis aligned with the beam axis, or an off-axis-camera with a known relative pose with regard to the laser unit.

3. The total station according to claim 1,
    wherein matching is based on at least one of a pattern matching algorithm and a classification algorithm.

4. The total station according to claim 3,
    wherein the respective algorithm is designed for analysing image features captured within the overlap of the fields of view of the camera in the first face and in the second face.

5. The total station according to claim 4,
    wherein the image features comprise the imaging of at least one specifically designed target.

6. The total station according to claim 1, comprising:
    an Automatic Target Recognition (ATR)-system having an ATR-camera and a flash unit, said ATR-camera configured for capturing ATR-images of reflections of a flash emitted by the flash unit, wherein the camera is the ATR-camera.

7. The total station according to claim 1, comprising:
an Automatic Target Recognition (ATR)-system having an ATR-camera and a flash unit, said ATR-camera configured for capturing ATR-images of reflections of a flash emitted by the flash unit, wherein the pose of the ATR-camera relative to the camera is represented by a calibrateable pose-value,
wherein the computer is further configured for
receiving ATR-images from the ATR-camera, and
calibrating the pose-value based on at least one of a first image pair and a second image pair, said first image pair comprising the first image and a first ATR-image captured in the first face, and said second image pair comprising the second image and a second ATR-image captured in the second face.

8. The total station according to claim 1, wherein the instrument error comprises:
a tilting axis error of the horizontal axis.

9. The total station according to claim 1,
wherein in the first face and in the second face, the telescope is pointing in a direction close to the vertical axis.

10. A method of determining and factoring instrument errors of a total station in when performing a subsequent measurement, said total station having a base, a support rotatably arranged on the base around a vertical axis, an azimuthal angle encoder configured for measuring an azimuthal angle of the support, a telescope rotatably arranged on the support around a horizontal axis, said telescope including a laser unit configured for emitting a measuring beam along a beam axis, a camera configured for capturing images with a field of view comprising the beam axis at least in part, an elevative angle encoder configured for measuring an elevative angle of the telescope, and a computer unit, the method comprising:
receiving from the camera a first image captured in a first face and a second image captured in a second face, wherein in the second face the camera is rotated around the optical axis by between 170° and 190° with respect to the first face, and wherein the fields of view of the camera in the first face and in the second face overlap at least in part,
receiving at least one of an azimuthal angle pair from the azimuthal angle encoder or an elevative angle pair from the elevative angle encoder, said azimuthal angle pair comprising a first azimuthal angle in a first face and a second azimuthal angle in a second face, and said elevative angle pair comprising a first elevative angle in the first face and a second elevative angle in the second face, matching the first image and the second image with a relative rotation and a relative translation,
determining the relative rotation of the matched first image and second image,
determining the relative translation of the matched first image and second image,
based on the elevative angle pair or the azimuthal angle pair, the relative rotation, the relative translation, determining an instrument error comprising at least one of
a horizontal collimation error,
a vertical index error,
based on the instrument error, applying an angle offset to each reading of the elevative angle encoder or the azimuthal angle encoder.

11. The method according to claim 10,
wherein matching is based on at least one of a pattern matching algorithm and a classification algorithm.

12. The method according to claim 11, comprising
with the respective algorithm, analysing image features captured within the overlap of the fields of view of the camera in the first face and in the second face.

13. The method according to claim 10,
wherein the total station further has an Automatic Target Recognition (ATR)-system having an ATR-camera and a flash unit, wherein the method further comprises
with the ATR-camera, capturing at least one of a first image pair and a second image pair, said first image pair comprising the first image and a first ATR-image captured in the first face, and said second image pair comprising the second image and a second ATR-image captured in the second face, said ATR-images capturing reflections of a flash emitted by the flash unit, wherein the pose of the ATR-camera relative to the camera is represented by a calibrateable pose-value,
with the computer unit, receiving from the ATR-camera the first image pair or the second image pair, respectively, and
with the computer unit, calibrating the pose-value based on the first image pair or the second image pair, respectively.

14. The method according to claim 10,
wherein in the first face and in the second face, the telescope is pointing in a direction close to the vertical axis.

15. A computer programme product comprising program code stored on a non-transitory machine-readable medium that when executed by one or more processors cause performance of operations for executing the method according to claim 1.

* * * * *